United States Patent
Bouvier et al.

(10) Patent No.: US 10,457,312 B2
(45) Date of Patent: Oct. 29, 2019

(54) VEHICLE STEERING COLUMN COMPRISING A RACK WEDGE

(71) Applicant: Robert Bosch Automotive Steering Vendôme, Vendôme (FR)

(72) Inventors: Eric Bouvier, Vendôme (FR); Sylvain Lubineau, Savigny sur Braye (FR); Loïc Villaume, Vendôme (FR)

(73) Assignee: Robert Bosch Automotive Steering Vendôme, Vendôme (FR)

( * ) Notice: Subject to any disclaimer, the term of this patent is extended or adjusted under 35 U.S.C. 154(b) by 242 days.

(21) Appl. No.: 15/523,083

(22) PCT Filed: Oct. 6, 2015

(86) PCT No.: PCT/FR2015/052684
§ 371 (c)(1),
(2) Date: Apr. 28, 2017

(87) PCT Pub. No.: WO2016/066914
PCT Pub. Date: May 6, 2016

(65) Prior Publication Data
US 2018/0281839 A1    Oct. 4, 2018

(30) Foreign Application Priority Data
Oct. 30, 2014 (FR) .................................. 14 60478

(51) Int. Cl.
*B62D 1/184* (2006.01)
*B62D 1/185* (2006.01)

(52) U.S. Cl.
CPC .............. *B62D 1/184* (2013.01); *B62D 1/185* (2013.01)

(58) Field of Classification Search
CPC .......... B62D 1/184; B62D 1/187; B62D 1/18; B62D 1/16
(Continued)

(56) References Cited

U.S. PATENT DOCUMENTS 5,787,759 A * 8/1998 Olgren .................. B62D 1/184
280/777
6,272,946 B1   8/2001 Roux
(Continued)

FOREIGN PATENT DOCUMENTS

CN    103889820 A    6/2014
FR    2979881        3/2013
(Continued)

OTHER PUBLICATIONS

Written Opinion and International Search Report for International Application No. PCT/FR2015/052684 dated Jan. 28, 2016.
(Continued)

*Primary Examiner* — Toan C To
(74) *Attorney, Agent, or Firm* — Patterson Thuente Pedersen, P.A.

(57) ABSTRACT

A steering column having: an adjustable body intended to be mounted so as to be free to slide on a support and comprising two walls, a tube fixed to the adjustable body, a wedge inside the adjustable body and mobile between an unlocked position and a locking position inside the adjustable body between and at a distance from the walls, driving means and guiding means for the wedge, arranged with the wedge so as to be able to drive the wedge in a simple translation movement so that the wedge can come to bear against the adjustable body to immobilize the adjustable body relative to the wedge.

19 Claims, 6 Drawing Sheets

(58) Field of Classification Search
USPC .................................................. 74/492, 493
See application file for complete search history.

(56) References Cited

U.S. PATENT DOCUMENTS

| | | | |
|---|---|---|---|
| 6,419,269 B1* | 7/2002 | Manwaring | B62D 1/184 |
| | | | 280/775 |
| 7,635,149 B2* | 12/2009 | Menjak | B62D 1/184 |
| | | | 280/775 |
| 8,327,733 B2* | 12/2012 | Ozsoylu | B62D 1/184 |
| | | | 280/775 |
| 9,168,945 B2 | 10/2015 | Hiesse et al. | |
| 9,487,228 B2 | 11/2016 | Fevre et al. | |
| 9,863,479 B2 | 1/2018 | Mottier et al. | |
| 2004/0035238 A1* | 2/2004 | Jolley | B62D 1/184 |
| | | | 74/493 |
| 2004/0251673 A1* | 12/2004 | Lee | B62D 1/184 |
| | | | 280/775 |
| 2004/0261565 A1* | 12/2004 | Uphaus | B62D 1/184 |
| | | | 74/493 |
| 2008/0196536 A1 | 8/2008 | Manwaring et al. | |
| 2008/0202276 A1* | 8/2008 | Harris | B62D 1/184 |
| | | | 74/493 |
| 2011/0041642 A1* | 2/2011 | Havlicek | B62D 1/184 |
| | | | 74/493 |
| 2012/0125140 A1* | 5/2012 | Ridgway | B62D 1/184 |
| | | | 74/493 |
| 2013/0174684 A1 | 7/2013 | Burns | |
| 2014/0260762 A1* | 9/2014 | Streng | B62D 1/195 |
| | | | 74/493 |
| 2015/0225009 A1* | 8/2015 | Sakata | B62D 1/185 |
| | | | 74/493 |
| 2017/0066468 A1* | 3/2017 | Tomiyama | B62D 1/184 |
| 2018/0100547 A1 | 4/2018 | Mottier et al. | |

FOREIGN PATENT DOCUMENTS

| | | |
|---|---|---|
| GB | 2116496 A | 9/1983 |
| JP | 2005138825 A | 6/2005 |
| JP | 2005153620 A | 6/2005 |
| WO | WO9309016 | 5/1993 |

OTHER PUBLICATIONS

Office Action dated Aug. 28, 2018 for Japanese Application No. 201580058997.9, 13 pages.

* cited by examiner

Fig. 4
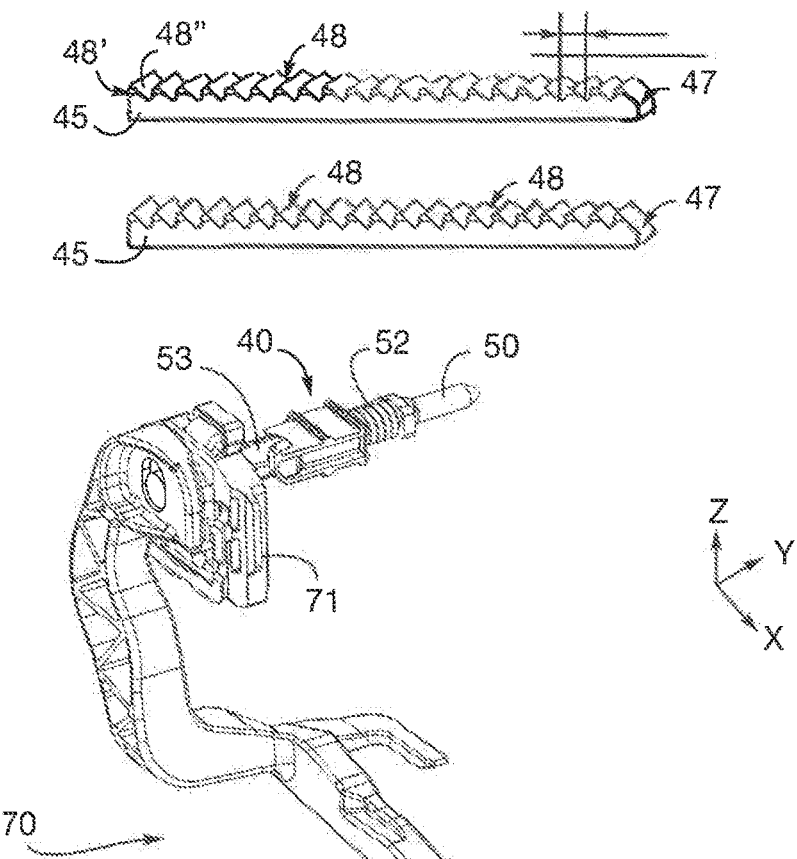
Fig. 5
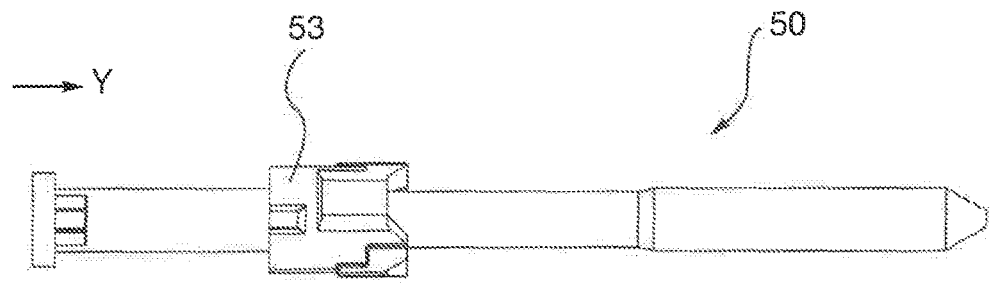
Fig. 6

VEHICLE STEERING COLUMN COMPRISING A RACK WEDGE

RELATED APPLICATIONS

The present application is a National Phase entry of PCT Application No. PCT/FR2015/052684, filed Oct. 6, 2015, which claims priority to FR 1460478, filed Oct. 30, 2014, the contents of each being incorporated herein by reference in their entireties.

TECHNICAL FIELD

The present invention concerns an adjustable vehicle steering column and the elements and subassemblies of elements constituting it.

The steering column according to the invention is notably although not exclusively intended for a motor vehicle.

BACKGROUND ART

Steering columns transmit the rotation of the steering wheel to the wheels to modify their orientation, for example according to the following order: the steering wheel, the steering column, the intermediate axle, the rack and finally the wheels.

Current steering columns allow adjustment of the steering wheel in depth and/or in height by way of an axial adjustment of the columns. A steering column conventionally includes:
- a support, also termed a bracket, intended to be fixed to the chassis of the vehicle according to a single position,
- an adjustable body mounted to be mobile in the support element,
- a tube mounted on the adjustable body and connected to the steering wheel, and
- a device for clamping and immobilizing the adjustable body in position on the support.

In known adjustable steering columns a control enables placing the clamping and immobilizing device in a position termed the locked position in which the adjustable body is immobilized in position on the support and a position termed the unlocked position in which the adjustment of the steering column in depth and/or in height is allowed, the adjustable body no longer being immobilized in position on the support.

On an axially adjustable steering column, the requirement is to have means for axially locking the required position of the column and a device for dissipating or absorbing the energy generated in the event of a front-end collision of the vehicle with an obstacle following the impact of the driver on the steering column.

Accordingly, in the event of a front-end collision, to reduce the impact on the driver, should he strike the steering wheel, the tube can generally move relative to the adjustable body. For example, the tube can travel a distance termed the stroke in the adjustable body to absorb the energy.

On the other hand, as the adjustable body must remain in position, notably to avoid damaging certain units of the vehicle by descending too low, a system is provided to immobilize the adjustable body, notably in its locked position.

For example, the document WO9309016A1 describes a jaw mechanism placed on the outside of the body that is moved away from or toward the body with a rotation movement. The jaw bears on the body to immobilize the latter in the event of an impact.

However, this mechanism has a certain overall size because space must be provided beside the column to allow the movements of the ratchet.

SUMMARY OF THE INVENTION

The technical problem addressed by the embodiments of invention is therefore reducing the overall size of a system for immobilizing in position an adjustable steering column body in the event of collision with a vehicle.

To this end, a first object of the embodiments of invention is a steering column comprising:
- an adjustable body intended to be mounted so as to be free to slide on a support intended to be fixed at a single position to a vehicle chassis,
- a tube fixed to the adjustable body, intended to be connected to the steering wheel of the vehicle,
- a wedge housed inside the adjustable body and mobile between an unlocked position and a locking position inside the adjustable body,
- means for driving and means for guiding the wedge, arranged with the wedge so as on the one hand to be able to drive the wedge in a simple translation movement from the unlocked position toward the locking position so that the wedge can come to bear against the adjustable body to immobilize the adjustable body relative to the wedge, the wedge then being in the locking position, and on the other hand to immobilize the wedge in the locking position in a fixed manner relative to some of the driving means that are adapted to be fixed relative to the chassis of the vehicle when the wedge is in the locking position.

Accordingly, when the steering column is mounted in the vehicle, the adjustable body fixed to the support, itself fixed to the vehicle, the wedge will be able to immobilize the body and therefore to immobilize it relative to the chassis of the vehicle. As the wedge moves inside the the body, the overall size is reduced.

Moreover, the wedge moving in accordance with a simple translation movement, the overall size is less than with a wedge the movement of which includes a rotation.

According to one embodiment of the invention, the adjustable body comprises two walls, the wedge being housed inside the adjustable body and mobile between an unlocked position and a locking position inside the adjustable body, between and at a distance from the walls of the latter. This makes it possible to reinforce the retention in the axial direction, i.e. parallel to the longitudinal axis of the tube, the bearing point being closer to the centre of the adjustable body and the longitudinal axis of the tube.

According to one embodiment of the invention, the translation movement can be tangential to the adjustable body. This makes it possible to reduce the overall size further, for example compared to the prior art mechanism that moves radially toward the adjustable body.

According to one embodiment of the invention, the translation movement is transverse to the longitudinal axis of the adjustable body. This makes it possible to reinforce the axial immobilization, i.e. this reinforces the immobilization of axial or longitudinal movement of the body relative to the axis of the tube.

According to one embodiment of the invention, the adjustable body comprises at least one guiding face against which the wedge is able to slide when the wedge is driven in movement. This makes it possible to assure the movement in translation of the wedge. In this case, embodiment of the invention can optionally have one or more of the following features:

- the adjustable body comprises two parallel guiding faces, the wedge being housed between the two guiding faces; this enables improved guidance;
- each guiding face includes a row of teeth, the wedge comprising at least one row of teeth facing the corresponding row of teeth of the guiding face and adapted, when the wedge is in the locking position, to bear against the corresponding row of teeth of the guiding face; this makes it possible to reinforce the immobilization of the adjustable body;
- the teeth of the rows of teeth are oriented so that each tooth points in a direction parallel to the corresponding guiding face; this enables greater tolerance in the positioning of the row or rows of teeth carried by the wedge relative to that or those carried by the guiding faces of the body on movement in translation of the wedge, thus facilitating the meshing of the teeth;
- at least one row of teeth is formed by a rack;
- the rack has:
  - a periphery with a toothed side, including the points of the teeth, and
  - at least one face delimited by the periphery, the face being parallel to the corresponding face of the wedge or of the body to which the rack is fixed;

this makes possible a simple implementation of the row of teeth, notably when the teeth point in a direction parallel to the corresponding guiding face;

- at least one of the racks is a component mounted on the wedge and/or on the corresponding guiding face, the component being fixed to the wedge and/or to the guiding face, notably by gluing, welding, screwing, riveting, clipping; for example, the rack can be carried with a ring slipped onto the wedge, and possibly fixed to the ring, notably by clipping;
- at least one of the racks is formed, notably pressed, in one piece with the wedge and/or the corresponding guiding face; this therefore reduces the number of parts and facilitates assembly;
- the rows of teeth are aligned parallel to the longitudinal axis of the tube; this reinforces the immobilization of the column to an axial movement, i.e. longitudinally relative to the axis of the tube;
- the adjustable body includes an envelope defining a sliding chamber inside which the tube is sleeved, the envelope gripping the tube strongly enough for the tube to be fastened to the adjustment body upon sliding of the latter in the support but not enough to allow sliding of the tube in the sliding envelope in the event of a front-end collision, the guiding face or faces being outside this sliding chamber; this is a simple embodiment of the invention in the context of a tube able to move relative to the column in the event of a front-end collision;
- the wedge is globally parallelepipedal;
- the wedge has at least one guided face facing the guiding face or faces, the rows of teeth of the guided face or faces being arranged transversely and alternately with the rows of teeth of the guiding face or faces;
- the sides of the teeth of the row or rows of the guided face or faces are able to slide along the corresponding guiding face or faces;
- the guided face or faces of the wedge are able to slide on the sides of the teeth of the row or rows of the corresponding guiding face or faces.

According to one embodiment of the invention, the driving and guiding means comprise a shaft on which the wedge is mounted. This enables a simple embodiment for both driving and guiding the wedge. In this case, embodiments of the invention may optionally have one or more of the following features:

- the shaft passes through the wedge; this embodiment facilitates guiding of the wedge, notably relative to the axis of the shaft; this also enables a reduction in overall size;
- the steering column comprises a principal elastic means inside the adjustable body, bearing at one end on the wedge, the other end being mounted against an abutment adapted to be immobilized relative to the shaft, the abutment, the principal elastic means and the wedge being mounted and aligned on the shaft according to a mounting direction along the shaft extending from the abutment to the wedge, the mounting direction being the same as the direction of movement in translation of the wedge toward its locking position, the abutment, the principal elastic means and the wedge being arranged so that when the wedge is in the locking position the principal elastic means are loaded and therefore exert a force on the wedge so that the wedge bears on the adjustable body; this enables reinforcement of the immobilization of the adjustable body by the wedge; this is also particularly advantageous in embodiments with features whereby rows of teeth cooperate, like the rows of teeth referred to above, because it enables an immobilizing force to continue to be produced even if the points of the teeth are positioned one against the other; this latter advantage will be exemplified hereinafter;
- the principal elastic means consist of a coil spring; according to one embodiment, the turns of the spring are wound around the shaft, which yields a less bulky solution and enables buckling of the spring to be prevented; the principal elastic means may be the only elastic means on the shaft;
- the abutment is mobile on the shaft, along the shaft, the steering column comprising means against which the abutment can be stopped in the locking position;
- the abutment comprises at least one arm, arranged on one side of the principal elastic means and outside the latter, for example parallel to the shaft, the wedge comprising at least one slideway on one side of the shaft, the arm being adapted to slide in the slideway; this enables reinforcement of the guiding of the wedge according to a simple translation movement; the abutment can comprise a plurality of arms, for example two arms, notably parallel arms, arranged on either side of the principal elastic means and outside the latter, the wedge comprising two slideways on either side of the shaft, notably on the sides of the wedge;
- the arm or arms comprise(s) a head wider than the rest of the corresponding arm, the head being adapted to slide between the rails of the corresponding slideway;
- the slideway comprises a constriction against which the head is adapted to abut; this facilitates mounting of the principal elastic means against the wedge when preloaded;
- the shaft and the wedge each comprise a profile, the profiles being in contact and such that in a locking rotation direction of the shaft the profile of the shaft bears on that of the wedge and drives its movement along the shaft toward its locking position;

the profile of the shaft is a screwthread and the wedge features a screwthread complementary to that of the screwthread, the rotation of the shaft driving the movement of the wedge by virtue of the principle of a lead screw;

the profile of the shaft and the profile of the wedge are complementary cam profiles;

the shaft may be made in one piece with its profile; the profile can therefore be moulded directly with the shaft;

the shaft may be formed of at least two parts, a bar part and another part sleeved on and fixed to the bar;

in the embodiments of the invention cited above in which the shaft and the wedge each comprise a profile, the steering column may comprise principal elastic means with the features recited above, the principal elastic means being arranged on the shaft on one side of the wedge so that when the wedge moves toward its unlocked position the principal elastic means are compressed and the force therein increases; the principal elastic means therefore exert a force for returning the wedge toward its locking position; in this case the spring may be adapted so as to be mounted when preloaded between the wedge and the abutment so that it always is loaded when the wedge is in the locking position;

in embodiments alternative to the embodiments of the invention cited above in which the shaft and the wedge each comprise a profile, the drive means comprise a mobile abutment and means for pushing the mobile abutment in translation along the shaft, notably a cam system or a pin system, the mobile abutment being connected to the wedge so as to be able to push the latter when the mobile abutment is pushed by the pushing means in the direction of movement in translation of the wedge toward its locking position;

the steering column according to the preceding paragraph may comprise principal elastic means having the features stated above, the principal elastic means being arranged on the shaft on the one hand on one side of the wedge, notably the side oriented toward a control lever for actuating rotation of the shaft, and on the other hand between the mobile abutment and the wedge, the principal elastic means therefore connecting the mobile abutment to the wedge so that when the mobile abutment is pushed by the pushing means it pushes the wedge toward its locking position via the spring; the mobile abutment and its pushing means are such that when the wedge is immobilized against the adjustable body the mobile abutment continues to press on and compress the principal elastic means, the force in which increases; when the rotation of the shaft has finished, the mobile abutment is immobilized, for example by the pushing means connected to the support; the principal elastic means are therefore loaded and exert a force for returning the wedge toward its locking position; it is possible to place a secondary elastic means on the other side of the wedge, between the latter and the corresponding wall of the adjustable body; the secondary elastic means is such that the force therein increases when the wedge moves toward its locking position, the stiffness of the secondary elastic means being less than that of the principal elastic means, so that in the locking position the force exerted on the wedge by the secondary elastic means is less than that exerted on the wedge by the principal elastic means; the secondary elastic means therefore does not impede the return force of the principal elastic means;

the secondary elastic means is a coil spring; according to one embodiment, the turns of the spring are wound around the shaft;

the steering column according to the invention comprises the support intended to be fixed to the chassis of the vehicle, the shaft being fixed to the support on at least one side, notably on both sides, outside the adjustable body; in this embodiment, the shaft therefore enables fastening of the wedge to the chassis, this being a simple way to immobilize the wedge, and therefore the adjustable body, relative to the support, when the wedge is locked;

the steering column according to the invention comprises a control, notably a control lever, outside the adjustable body, the control actuating movement of the shaft so that it drives the movement of the wedge.

One embodiment of the invention also encompasses the combination of:

the embodiment of the invention described above in which the adjustable body has at least one guiding face against which the wedge is able to slide when the wedge is driven in movement, and possibly one or more of the associated optional features, and the embodiment of the invention described above in which the driving and guiding means comprise a shaft on which the wedge is mounted, and possibly one or more of the associated optional features.

The shaft and the wedge therefore cooperate in guiding the movement in translation of the wedge.

Embodiments of the invention may optionally also have one or more of the following features:

the guiding face or faces is or are parallel to the longitudinal axis of the driving shaft; this improves the guidance of the wedge;

the two walls of the adjustable body each include two oblong openings the greater length of which extends parallel to the axis of the tube, and the shaft passes through the adjustable body through these openings; the openings therefore position the shaft and enable its movement to continue on axial movement of the adjustable body, the shaft remaining through the adjustable body during the movement and sliding along the oblong openings;

the shaft is a clamping screw with at one end a screwthread screwing into a hole having a complementary screwthread arranged outside the adjustable body, the shaft being adapted to bear transversely, i.e. perpendicularly to the longitudinal axis of the tube, on the external faces of the support that face the two walls of the adjustable body so that on screwing the shaft the walls of the support are clamped against the walls of the adjustable body; the shaft can bear on the support walls indirectly, notably via nuts, shoes, washers;

the adjustable body comprises two spacers joining the two walls through which the shaft passes, the spacers having facing faces that form the guiding faces, the walls and the spacers defining a wedge housing; this is a compact embodiment facilitating production of the guiding faces and positioning of the shaft;

the tube passes alongside and outside the wedge housing.

According to one embodiment of the invention, the driving means intended to be fixed to the chassis of the vehicle are fixed via the support. This provides a simple way to immobilize the wedge relative to the chassis and therefore to immobilize the the body relative to the chassis.

According to one embodiment of the invention the adjustable body is made from one or more pressed plates. This simplifies its manufacture. This feature is also advantageously combinable with some features of the invention. In fact, this will facilitate production of:
- the walls of the adjustable body, notably with the oblong holes through which the driving shaft passes,
- the spacers carrying the guiding faces, the spacers being for example a pressed plate mounted on the pressed plate forming the rest of the adjustable body, notably by welding, or the spacers and the adjustable body being made in one piece from pressed plate,
- the racks, by pressing the spacers,
- the sliding chamber of the tube.

Other advantages will be further apparent to the person skilled in the art on reading the following examples, illustrated by the appended figures, provided by way of nonlimiting illustration.

BRIEF DESCRIPTION OF THE DRAWINGS

FIG. 4 represents rows of teeth according to embodiments of the invention.

FIG. 5 represents the device for immobilizing the adjustable body of the steering column according to one embodiment of the invention.

FIG. 6 represents a mechanism for actuating the wedge of the device from FIG. 5.

DETAILED DESCRIPTION

Figure 1:
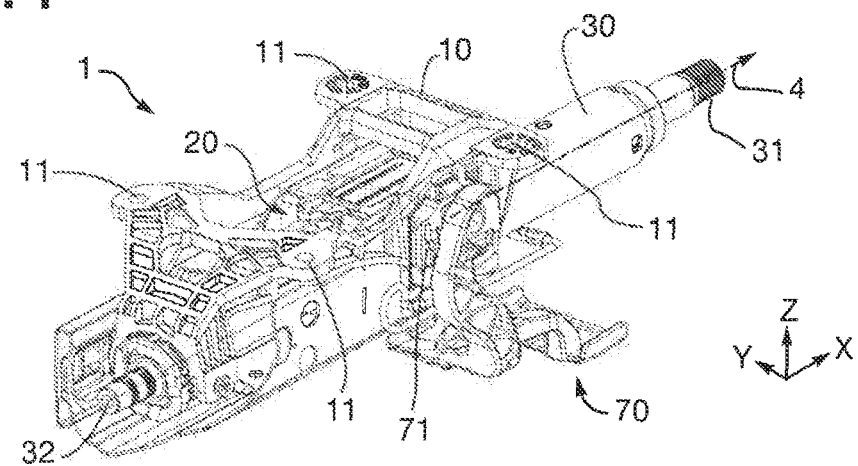
FIG. 1 represents a steering column according to an embodiment of the invention.

FIG. 1 shows an example of a steering column 1 according to an embodiment of the invention. The latter comprises a body-tube subassembly comprising an adjustable body 20 connected to a tube 30. The tube is intended to be connected to the steering wheel (not shown) of the vehicle, in this example via the end 31 of a first shaft sleeved in the tube 30. The rotation of the steering wheel is transmitted via this shaft 31 to another shaft 32 at the other end of the steering column 1 which is then connected indirectly to a rack and then to the wheels.

Generally speaking, the steering column 1 is oriented longitudinally along an axis corresponding to the longitudinal axis 4 of the tube 30.

Some of the illustrations of the present application show an orthonomic frame of reference (x, y, z) to facilitate the understanding of the orientation of the parts. The axis x is parallel to the direction of the longitudinal axis 4.

As can be seen, the steering column comprises a support 10 into which the adjustable body 20 is fixed. The support 10 is intended to be fixed to the chassis of the vehicle in an immovable manner, that is to say at a single position. It is therefore the support 10 that fixes the steering column 1 to the vehicle.

The adjustable body 20 is slidably mounted in the support 10. This enables the driver to adjust the adjustable body 20 by longitudinally sliding it along the axis 4 and therefore to adjust the position of the steering wheel in depth, i.e. to move it toward or away from the dashboard.

A locking mechanism is provided for locking and immobilizing the steering column in the axial direction, therefore along the longitudinal axis 4. The mechanism is actuated by a lever 70. For example, the locking mechanism comprises a clamping means adapted to move the walls of the support 10 toward one another so that they come to bear on the walls of the adjustable body 20 and clamp the latter on either side so as to immobilize it. For example, the locking means may comprise a clamping screw one end of which is interengaged with a wall of the adjustable body and is connected to the control lever 70. The other end of the clamping screw is screwed to the opposite wall of the adjustable body in a nut interengaged with the opposite wall. Actuation of the clamping screw therefore leads to clamping or releasing of the adjustable body in the support, as in a vice.

Generally speaking, according to embodiments of the invention, the tube 30 is fixed relative to the adjustable body 20. By achieving immobilization by means of a wedge (exemplified hereinafter) directly on the adjustable body 20, and not on the tube 30, the immobilization of the adjustable body is achieved independently of the connection between the adjustable body 20 and the tube 30.

The locking mechanism will immobilize the adjustable body to prevent it from descending and damaging elements of the vehicle situated below the steering column 1.

According to one embodiment of the invention, the tube 30, the adjustable body 20 and the fixing thereof to one another are nevertheless such that if the driver is thrown against the steering wheel in the event of a front-end impact to the vehicle the tube 30 and the adjustable body 20 can slide one relative to the other. This enables some of the energy of the impact to be absorbed and injuries sustained by the driver in the event of contact with the steering wheel to be reduced. The invention is particularly advantageous in such a situation because the wedge will be able to immobilize the adjustable body relative to the chassis whilst leaving the tube 30 free to slide relative to the adjustable body 20. It therefore protects other components of the vehicle as well as the driver.

Figure 3:
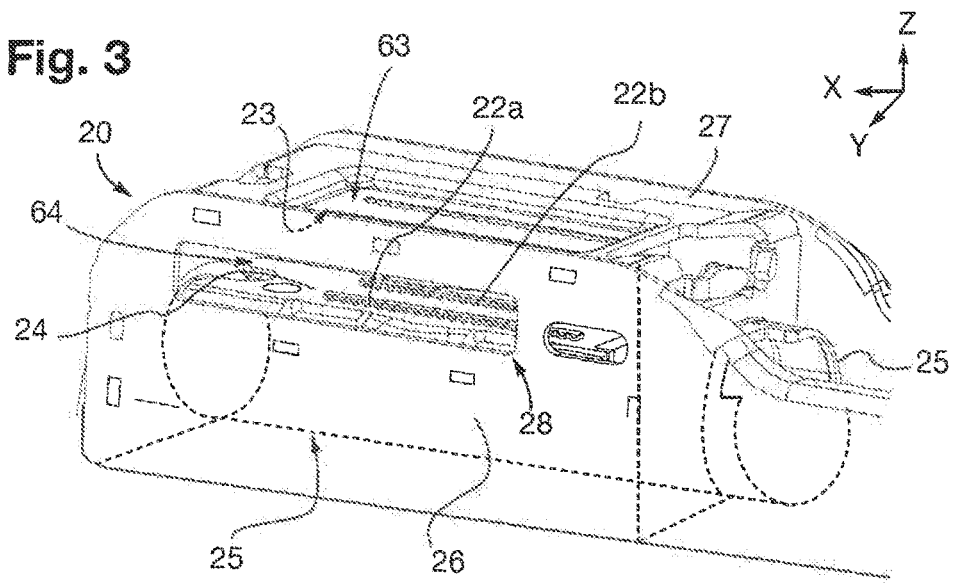
FIG. 3 represents the part of the adjustable body from FIG. 2, in perspective and from slightly above.

To be more specific, in the situation shown in FIG. 1 and FIG. 3, the adjustable body 20 comprises an envelope 25 defining a sliding chamber inside which the tube 30 is sleeved. Means that are not shown enable a sufficient force to be exerted to immobilize the tube 30 in this chamber and at a distance from the bottom of the latter during normal use of the vehicle. However, in the event of a violent impact to the steering wheel, for example by the body of the driver in the event of a front-end impact to the vehicle, the latter means will be insufficient to retain the tube, which will slide in the chamber and thus damp the energy of the impact of the driver against the steering wheel. The means can be fusible means, elastic means, notably a spring, or simply the effect of compression of the air in the chamber by the tube 30. They may equally consist of the friction forces between the walls of the tube 30 and those of the sliding chamber, the tube being a force fit in the latter.

Figure 15:
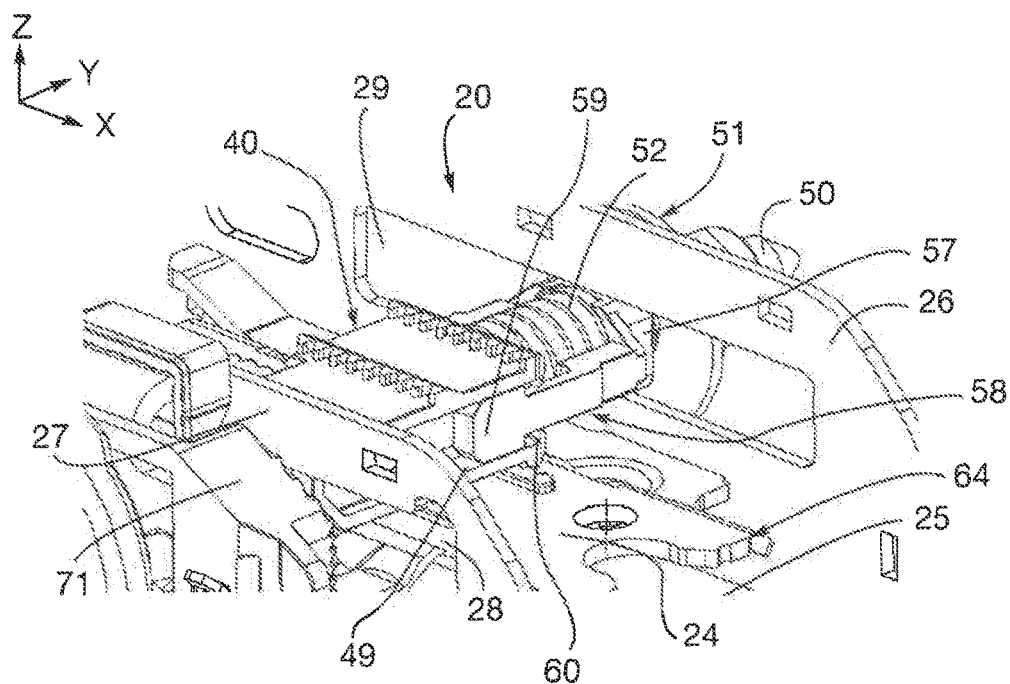
FIG. 15 represents a part of the steering column from FIG. 1, in perspective and from slightly above.

FIG. 5 shows the device according to a first embodiment of the invention for locking the steering column 1. It comprises a wedge 40 threaded onto and free to slide on a driving shaft 50. The shaft is connected on one side to a control lever 70 for actuating the movement of the shaft 50, which will therefore drive the wedge 40 between an unlocked position and a locking position, for example via a driving part 53 mounted on the driving shaft as explained hereinafter. This shaft 50 passes through the adjustable body 20. The wedge 40 is housed inside the adjustable body 20 at all times, regardless of its movement. FIG. 15 shows how the wedge 40 and the shaft 50 are positioned in the adjustable body.

In this example the shaft 50 is also the clamping screw referred to above in this detailed description. This enables the shaft to be retained in position by a simple screwing action.

Figure 2:
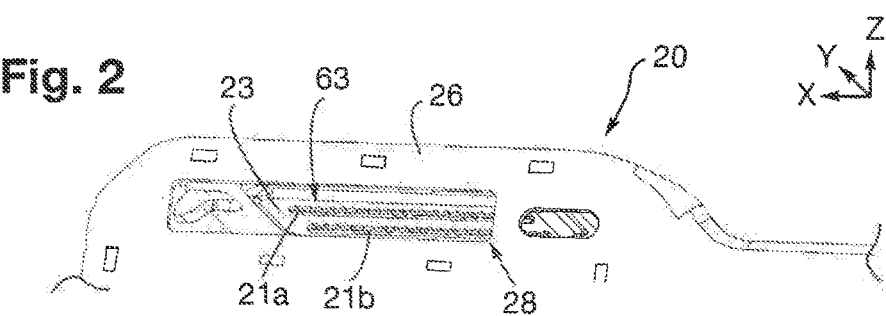
FIG. 2 represents a part of the adjustable body of the column from FIG. 1 in perspective and from slightly below.

FIGS. 2 and 3 show this adjustable body 20 separately. It comprises two plane walls 26, 27 extending outside the sliding chamber, notably tangentially to the sliding chamber. This structure is obtained in this example by bending a pressed plate. These walls 26, 27 each include two longitudinal openings 28, 29, the shaft 50 passing through the adjustable body 20 through the openings. The wedge 40 is housed between the two walls.

The adjustable body 20 comprises two spacers 63, 64 joining the two walls 26, 27 through which the shaft 50 passes. The walls 26, 27 and the spacers 63, 64 define a housing for the wedge 40 separated from the sliding chamber by one of the spacers, the lower spacer 64 in the figures. In FIG. 15 the upper spacer 63 is not shown so that the wedge 40 can be seen.

The spacers 63, 64 have facing faces that form the faces 23, 24 for guiding the wedge 40.

Figure 7:
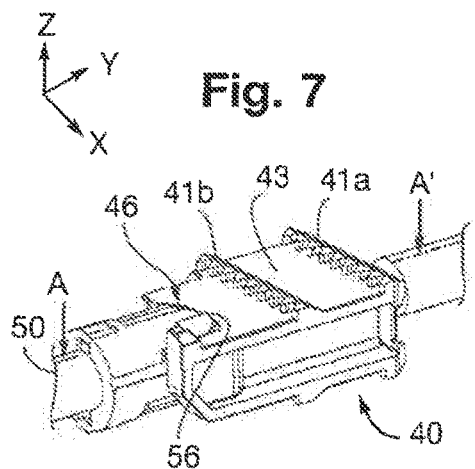
FIG. 7 represents the actuating mechanism and the wedge of the device from FIG. 5, in perspective and from slightly above.
Figure 8:
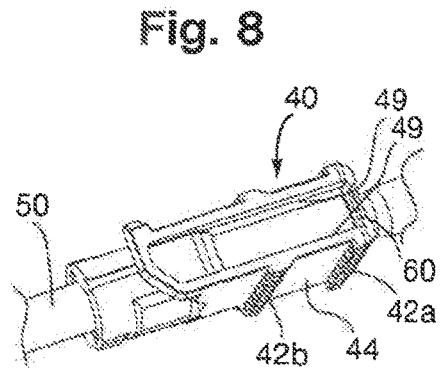
FIG. 8 represents the same elements as FIG. 7, in perspective and from slightly below.

As shown in FIGS. 7 and 8, the shaft 50 and the wedge 40 each comprise respective complementary cam profiles 56 and 46 in contact. The wedge 40 is free to slide along the shaft 50. Its profile 46 includes a ramp oriented obliquely relative to the longitudinal axis 4. As shown in FIG. 6, the driving part 53 is fixedly mounted on the axis of the shaft 50 and immobile relative to the latter. The driving part 53 comprises a tenon carrying the profile 56. Actuation of the control 70 will therefore drive the rotation of the shaft 50 and therefore of the profile 56 of the driving part 53 which, by bearing on the ramp of the cam profile 46 of the wedge 40, will push the wedge 40 away from the wall 27, i.e. the wall that is nearer the control lever. This movement is effected by sliding of the wedge 40 on the shaft 50 which therefore serves at the same time as means for driving and means for guiding movement along the axis of the shaft 50. This movement corresponds to the movement of the wedge toward its locked position.

The guiding faces 23, 24 enable the wedge 40 to be guided so that it retains its orientation relative to the shaft 50 as it moves. In other words, they enable the wedge 40 to move with a simple movement in translation with limited rotation relative to the axis of the shaft 50. To improve this guidance, the guiding faces 23, 24 are parallel to one another.

In this example, the guiding faces 23, 24 are also parallel to the longitudinal axis 4 of the tube 30. This allows movement in translation of the wedge 40 tangentially to the adjustable body 20, requiring much less room than translation in some other direction, which would then necessitate larger walls 26 and 27.

In this example, the shaft 50 is transverse to the longitudinal axis of the adjustable body 20, which is itself parallel to the longitudinal axis of the tube 4. In the figures the shaft 50 is therefore oriented along the axis Y.

The wedge 40 has plane faces 43 and 44 facing the guiding faces 23 and 24 of the adjustable body. The plane faces 43, 44 of the wedge are termed guided faces hereinafter. The wedge 40 will therefore be guided more effectively along the axis of the shaft 50 between two planes.

Each guiding face 23, 24 includes two rows of teeth 21a, 21b and 22a, 22b. Likewise, each of the guided faces 43, 44 comprises two rows of teeth 41a, 41b and 42a, 42b. These rows of teeth are arranged so that, when the wedge 40 is placed in the locking position, each row of the wedge 40 bears on a corresponding row of teeth of the adjustable body 20.

In this example, each row of teeth 21a, 21b, 22a, 22b, 41a, 41b, 42a, 42b is formed by a rack. FIG. 4 shows both of the racks. Each has a periphery with a toothed side 47, comprising the points 48 of the teeth. The periphery delimits a first rack face 45 parallel to the corresponding face of the wedge 40 or the body 20 to which the rack is fixed. As shown in FIG. 4, these points have a rounded apex to facilitate the interengagement of the rows of teeth carried by the wedge and those carried by the guiding faces.

The racks are connected to the guided face 43, 44 of the wedge 40 or the guiding face 23, 24 of the adjustable body 20 via the face opposite the first rack face 45 and so the face opposite the first rack face 45 is not visible. In other words, as can be seen in FIGS. 2 and 3, these teeth 21a, 21b, 22a, 22b, 41a, 41b, 42a, 42b are on their side, i.e. oriented so that each tooth points in a direction parallel to the guiding face 23, 24 or the guided face 43, 44 that carries them.

In this example, the racks 21a, 21b and 22a, 22b are formed in one piece with the respective guiding face 23 and 24 by pressing the plate forming the corresponding spacer 63, 64. In FIG. 3 recesses are seen on the spacer 63 that correspond to the pressing of the racks 21a and 21b. In FIG. 2, these recesses are seen from the other side of the spacer 63 and project out of and from the guiding face 23, thus forming the racks 21a and 21b. There is therefore no visible face opposite the first face 45 of the racks.

Likewise, as can be seen in FIGS. 7 and 8, the teeth of the racks 41a, 41b, 42a, 42b of the guided faces of the wedge 40 are on their side. On the other hand, in this example the racks 41a, 41b, 42a, 42b and the guided faces 43, 44 are in one piece because the wedge and its rows of teeth are made in one piece; for example the wedge and its rows of teeth may be a one-piece component produced by a single moulding operation.

The wedge 40 may for example be made of a polymer material, notably one reinforced with glass fibres.

Note that generally speaking, according to embodiments of the invention, the racks could be attached elements. In this case they can be made of metal and notably a zinc alloy.

Figure 9:
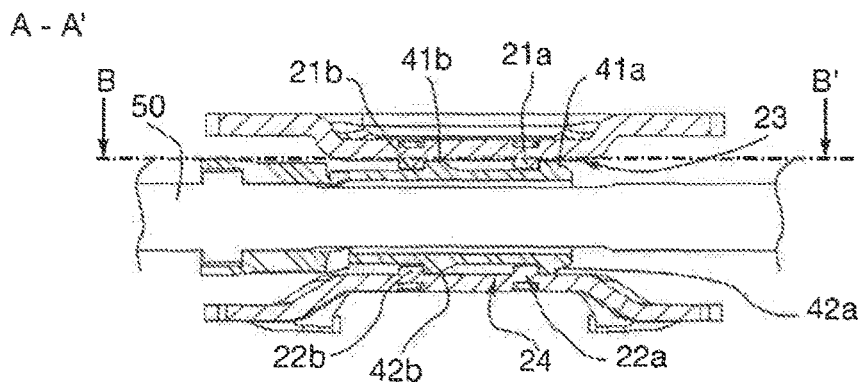
FIG. 9 represents a sectional view taken along the line AA' in FIG. 7.

For ease of manufacture, the wedge 40 is globally parallelepipedal. This embodiment makes it easier for the guided faces 43, 44 to be parallel to one another. The height of the wedge approximately corresponds to the distance between the guiding faces 23, 24 and is adjusted with a slight clearance so that it can slide, being guided by the guiding faces. As shown in FIG. 9, the rows of teeth 41a, 41b, of the upper guided face 43 of the wedge 40 are arranged transversely and alternately with the rows of teeth 21a, 21b of the guiding face 23. The sides of the teeth of the rows 41a, 41b of the upper guided face 43, in this example the first rack face 45, will therefore be able to slide along the guiding face 23. Likewise, the upper guided face 43 of the wedge will be able to slide on the sides of the teeth of the rows 21a, 21b of the guiding face 23. This embodiment therefore enables good guidance of the wedge in simple translation. A single row of teeth for the guiding face and for the guided face would suffice, but guidance is improved by using a pair for each face.

Moreover, applying the same principle on both sides of the wedge 40 improves guidance. The rows of teeth 42a, 42b of the lower guided face 44 of the wedge 40 are therefore arranged transversely and alternately with the rows of teeth 22a, 22b of the guiding face 24. The sides of the teeth of the rows 42a, 42b of the lower guided face 44 will therefore be able to slide along the guiding face 24. Likewise, the lower guided face 44 of the wedge will be able to slide on the sides of the teeth of the rows 22a, 22b of the guiding face 24.

The rows of teeth of the wedge, the racks in this example, are arranged facing the corresponding rows of teeth of the guiding faces, i.e. so that the points of the teeth of the rows of the wedge are oriented toward the points of the teeth of the corresponding rows of the guiding faces. Guidance in a plane is therefore obtained until the rows of teeth are able to mesh.

Figure 11:
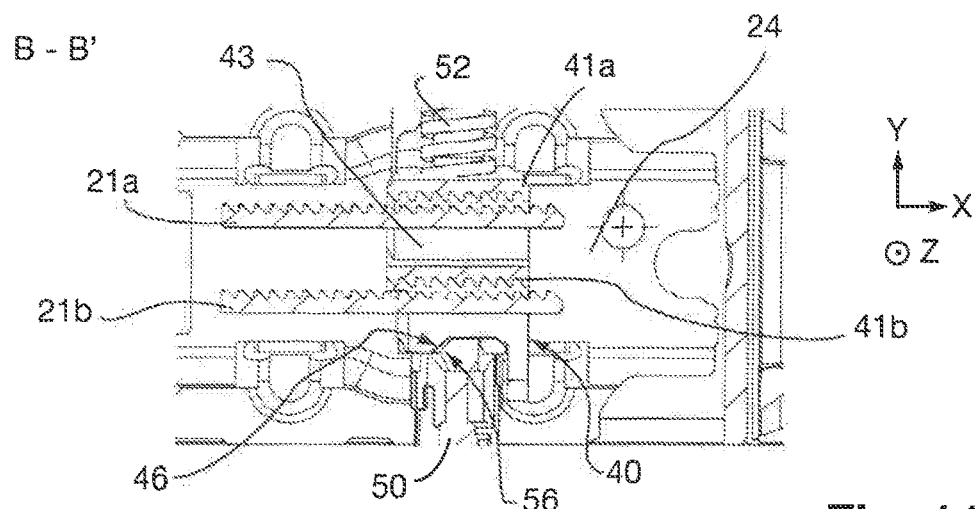
FIGS. 11 to 13 represent a view of the steering column of the invention as seen from above in section taken along the line BB' in FIG. 9 at the level of the wedge. These views 11 to 13 represent the wedge in the unlocked, locking and intermediate locking position, respectively.
Figure 12:
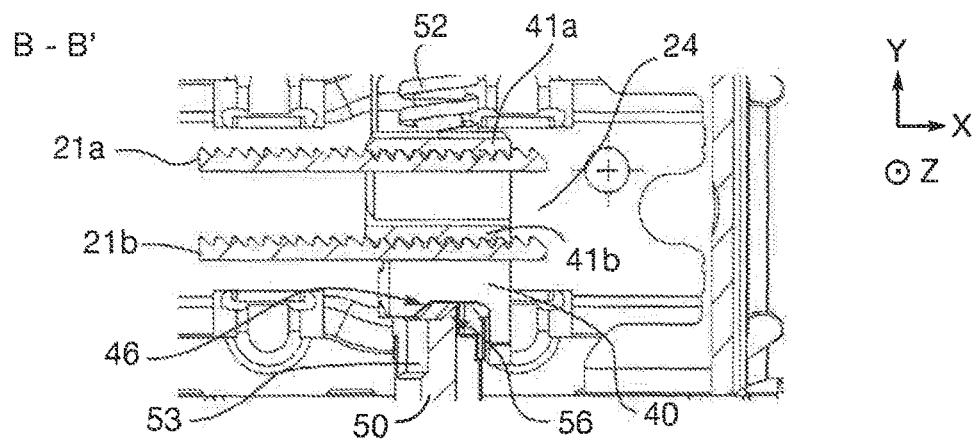
Figure 13:
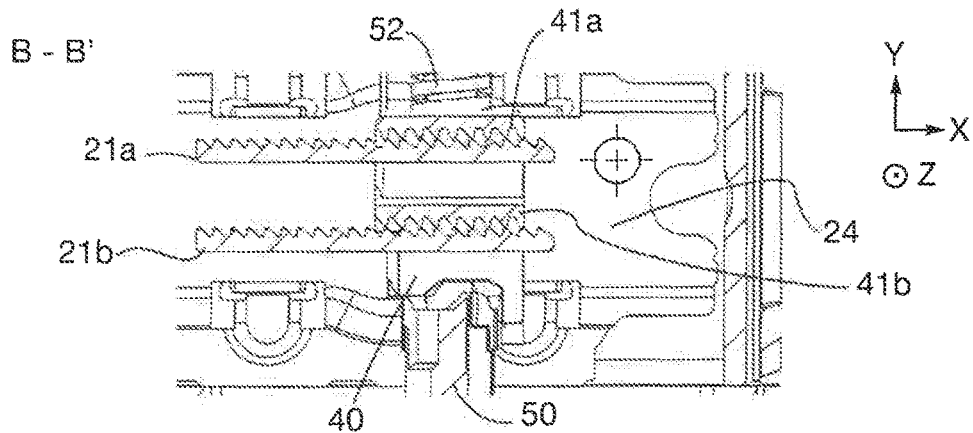

FIGS. 11 to 13 are sectional views as seen from above in a plane parallel to and passing through the rows of teeth 21a, 21b of the upper face 23. This upper face 23 is therefore not shown in FIGS. 11 to 13. These figures show the three possible positions in which the wedge 40 can be immobilized.

In FIG. 11 the wedge 40 is in its unlocked position. The rows of teeth 21a, 21b of the corresponding guiding face 23 are at a distance from those 41a, 41b of the upper guided face 43. The same applies at the level of the lower guided face 44 and the corresponding guiding face 24. The adjustable body 20 can therefore slide in the support 10. The ramps of the complementary cam profiles 56 and 46 are in contact. Because of this, the wedge 40 is held in position by the driving part 53, which is fixed to the shaft 50.

When the wedge 40 is driven in translation, it will reach a locking position shown in FIG. 12. The teeth of each of the rows mesh and the facing rows bear one against the other. The adjustable body 20 is therefore locked to the support 10 by the wedge 40. The steering wheel is therefore fixed and secured in position.

In this figure it can be seen that in the locking position the cam profiles 46 and 56 are arranged so that their ramps are at distance from one another. To show this clearance in FIG. 12 the call-outs of the reference numbers "46" and "56" point directly to the ramps. When the wedge 40 moves from its unlocked position (FIG. 11) to its locking position (FIG. 12) when pushed by the spring 52, the ramp of its cam profile 46 will follow and remain in contact with the ramp of the cam profile 56 of the positioning part 53. Because of the clearance, the rows of teeth will mesh before the positioning part 53 has stopped rotating. The ramps will therefore move apart since only the ramp of the cam profile 56 of the driving part continues to move. The clearance will facilitate the meshing of the teeth.

The triangular shape of the teeth and their arrangement relative to the translation movement enables the teeth to slide one against the other when the wedge 40 is driven to drive their complete meshing even if the adjustment is not exact.

If the points 48 of the teeth nevertheless arrive exactly in front of one another, the wedge 40 is in an intermediate locking position shown in FIG. 13, also termed the tooth on tooth position. The points then bear one against the other. The sawtooth shape makes it possible to limit the tooth on tooth positions, but they can still occur. Nevertheless, in the tooth on tooth position the rows bear one against the other and the adjustable body is properly immobilized.

A coil spring 52 is mounted on the driving shaft 50, its turns being wound around the shaft 50, inside the adjustable body 20. The spring bears on one side on the wedge 40 and on the other side on an abutment 57 able to slide on the shaft 50. This abutment 57 includes a portion able to pass through the oblong hole 29 so as to come to bear against the support 10. When the wedge moves toward its unlocking position, it compresses the spring 52, thereby increasing the force in it. This force decreases in the other direction. The spring therefore exerts a biasing effect toward the locking position. However, the spring 52 is adapted to remain preloaded in the locking position of the wedge 40. Here the spring is always compressed. This enables the steering column 1 to be held more firmly in the locking position in which the teeth mesh. This also enables the wedge 40 when in the tooth on tooth position to go instantaneously to the locking position in the event of a front-end impact.

The washer of the clamping system 51 can also be adapted so that, in the locking position, the walls of the support 10 being moved toward one another, the washer is in contact with the part of the abutment 57 passing through the support. It is then the washer that immobilizes the abutment 57 to maintain the preloading of the spring 52.

The rows of teeth are oriented longitudinally. Thus all the teeth are employed to resist an axial movement of the adjustable body 20, i.e. a movement parallel to the longitudinal axis 4 of the tube 30.

As shown in FIG. 4, the teeth can be asymmetrical. Here they comprise a face 48' perpendicular to the direction in which the row of teeth extends and therefore perpendicular to the sides of the teeth forming the rack face 45, the other face 48" being oblique relative to that direction. The perpendicular face 48' and the oblique face 48" join to form the point of the tooth. The perpendicular face 48' faces toward the steering wheel. This makes it possible to absorb directly downward forces along the axis of the column 1 when the column is mounted in the vehicle.

Note that the tooth being on its side, the perpendicular face 48' and the oblique face 48" also extend between the guided face 43, 44 or the guiding face 23, 24 that carries it and the side 45 of the teeth.

An example is given hereinafter of force resistance calculation for an embodiment with a wedge 40 including four rows 21a, 21b, 22a, 22b of nine teeth.

In the configuration with the teeth interengaged, upon the impact occasioned by a front-end collision, the preloading of the spring 52 makes it possible to prevent the racks becoming disengaged.

Considering that the requirement is, for example, to withstand a force of six thousand newtons of axial load in the collision, given the thirty six interengaged teeth, and a maximum angle of one degree of the face of the teeth because of the tolerances, the return force generated by preloading the spring has preferably been evaluated at a minimum of eighty seven newtons.

In the tooth on tooth configuration (FIG. 13), the movement occasioned on impact enables immediate interengagement of the teeth of the rows of teeth 41a, 41b, 42a, 42b of the wedge 40 in the rows of teeth 21a, 21 b, 22a, 22b of the adjustable body 20. This immediate meshing is by virtue of the stiffness of the spring 52, which makes it possible to prevent the teeth from jumping. This stiffness is determined by the speed of the impact, the mass of the axial rack and the pitch between two successive teeth.

Figure 10:
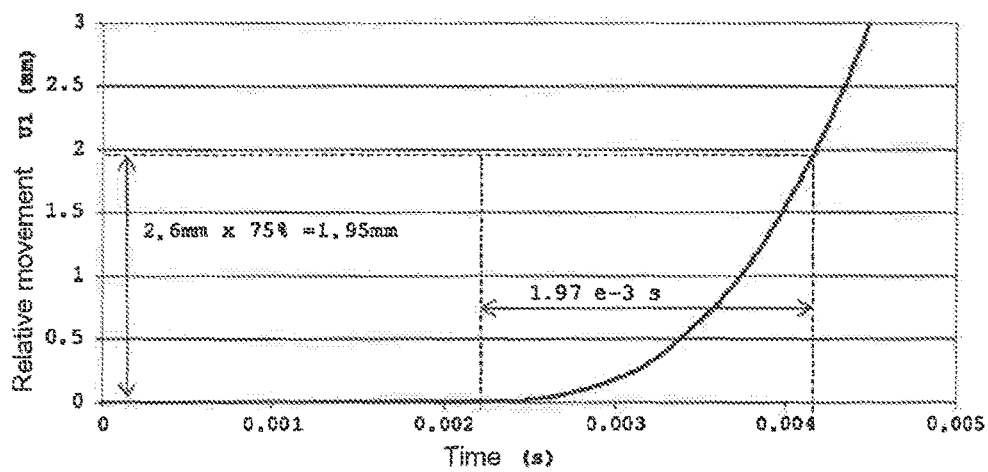
FIG. 10 is a table representing the movement of the adjustable body as a function of time.

The time necessary for the teeth to mesh is given by a crash simulation as indicated in the FIG. 10 table. In that table, U1 corresponds to the movement of the axially adjustable body 20.

In this example, the teeth 48 of each rack are spaced by 2.6 millimetres. It is estimated that meshing of the teeth will occur for an axial movement of 75% of the distance.

According to the curve from the table 1, the estimated necessary meshing time is 1.97 ms.

The stiffness necessary to enable the engagement is linked to the mass of the wedge 40 and given by the following formula:

$$k \geq m \cdot \left(\frac{\pi}{\Delta t}\right)^2$$

where k is the stiffness of the spring 52,
m is the mass of the wedge 40, and
Δt is the necessary engagement time.

Given the mass of the rack of 26.5 g, the minimum stiffness must preferably, although this is not limiting on the invention, be 67 N/mm.

According to this calculation example, it is therefore seen that with a spring having a stiffness of 67 N/mm it is possible to absorb a front-end impact generating an axial load of six thousand newtons during the collision, even in the tooth on tooth position.

The above values are not limiting on the invention but refer to a given example.

The shaft 50 is fixed to the support 10 outside the adjustable body 20.

In this example, the elements are in succession in the following order: the control lever 70, the connection between the control lever 70 and a first end of the driving shaft 50, the adjustable body 20. The driving shaft then passes through the adjustable body 20 through the oblong holes 28, 29 in the plane walls 26, 27 of the adjustable body. A clamping system 51 of the washer and nut type is positioned at the second end of the driving shaft 50 outside the adjustable body 20. The washer is larger than the oblong hole 29. This further makes it possible to ensure that the shaft 50 remains perpendicular to the longitudinal axis 4 of the tube.

The first end of the shaft 50 is driven by the rotation of the control lever 70. This can be achieved in different ways, including by a direct fixing.

In the example shown, a gripping part 71 is mounted on the control lever 70, between the control lever 70 and the support 10. For clarity, the latter is not shown in FIG. 15. In the latter figure the walls of the support 10 are intended to pass on either side of the adjustable body 20. A wall of the support 10 will therefore be accommodated between the wall 27 of the adjustable body 20 on the side of the control lever 70 and the gripping part 71. The other wall of the support 10 will be accommodated between the opposite wall 26 of the adjustable body 20 on the side of the clamping system 51 and the washer of the clamping system 51.

The gripping part 71 is connected to the control lever 70, for example by a cam or pin system, so that rotation of the control lever 70 drives the movement of the gripping part 71 in both directions, depending on the direction of rotation of the control lever 70. When the control lever 70 rotates in the locking direction, the gripping part 71 is driven until it is immobilized against the corresponding wall of the support 10. This gripping part 71 can for example have teeth meshing with the teeth of the support 10. Because of this, the adjustable body 20 will be held as in a vice between the gripping part 71 and the washer of the clamping system 51. As a result, it is possible to immobilize the steering column 1 by actuation of the lever 70. The shaft 50 therefore also serves as a clamping screw.

To adjust the height of the steering wheel it will suffice to release the clamping screw formed by the shaft 50. To do this the control lever 70 is rotated in the other direction. This action will lead on the one hand to the driven part 71 being moved away and the teeth carried by the wedge 40 being disengaged from the teeth carried by the adjustable body 20. The adjustable body 20 will then still be mounted on the support 10 but free to slide along the longitudinal axis 4.

Inside the adjustable body 20, along the shaft 50, in a direction from the first end of the shaft toward its second end, there are seen first the part 53 bearing the cam profile 56, then the wedge 40, then the spring 52.

The teeth of the wedge 40 are arranged toward the first end of the driving shaft 50 so that the drive means and the return force of the spring 52 enable the locking movement in by movement of the wedge 40 toward the connection with the control lever 70.

As illustrated at 15, the abutment 57 comprises an arm 58 along, to the side of and outside the spring 52. The wedge 40 comprises a slideway on the side joining the corresponding guided faces 43 and 44. The slideway forms two rails 49 between which the arm 58 will be able to slide. This enables reinforcement of the guidance of the wedge according to a simple translation movement.

According to the example shown, the arm 58 comprises a head 59 wider than the rest of the arm. It is the head that will slide between the rails 49. The back of the head can therefore come to abut against a constriction 60 of the slideway. This makes it easier to mount the spring 52 against the wedge 40 when it is preloaded.

Figure 14:
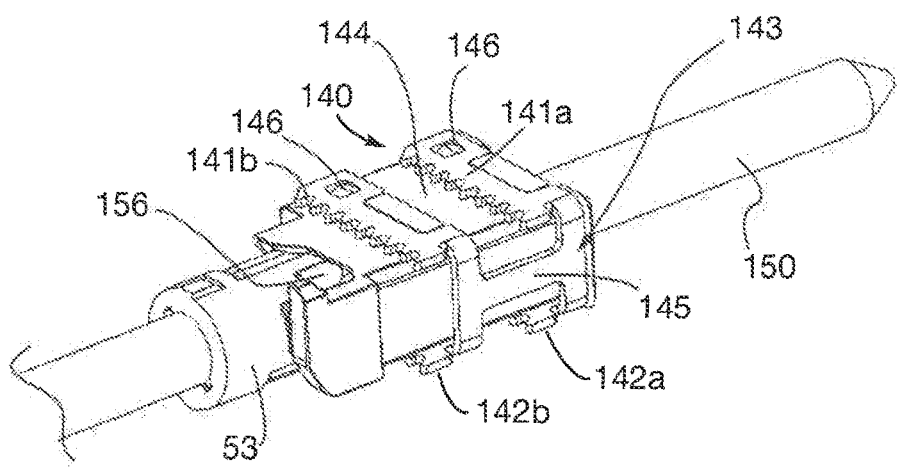
FIG. 14 represents an alternative embodiment to that of FIG. 7.

FIG. 14 shows a variant embodiment of the wedge. This wedge variation 140 differs from the preceding one 40 in that the rows of teeth 141a, 141b, 142a and 142b are part of a single part 143 sleeved onto a block 144. It is the block 144 that comprises the guided faces. The rows of teeth are connected on each side by an "H" portion with the result that the single part is formed of two rectangular loops. Each rectangular loop has four sides, two opposite sides each formed by a row of teeth 141a, 142a for one loop, 141b, 142b for the other loop, the sides being connected by third and fourth sides. The third sides of the loops are interconnected by a bar and with the bar form the "H" portion. Likewise the fourth sides.

The single part 143 can be a metal part clipped to the block 144, the latter being made of plastic. Here the elastic clipping claws 146 are on the plastic block 144. They clip into corresponding orifices in the single part 143. This example is the simplest embodiment. It would however be possible to interchange the claws and the orifices.

Alternatively, the single part 143 can equally be made of plastic and moulded over the plastic block 144.

FIGS. 16a, 16b, 17a and 17b show another embodiment in which the control lever 70 actuates a pin system 251/253/255 connected to the driving shaft 250.

Note that the adjustable body 20 of this embodiment is identical to that of the previous embodiment. It can therefore also be as shown in FIGS. 2 and 3.

Figure 16A:
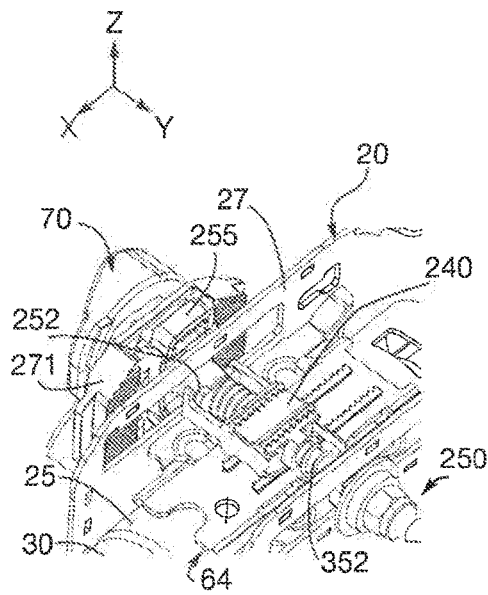
FIG. 16a represents a part of a steering column according to another embodiment of the invention, in perspective and from slightly above, the wedge being locked, the support not being shown.
Figure 16B:
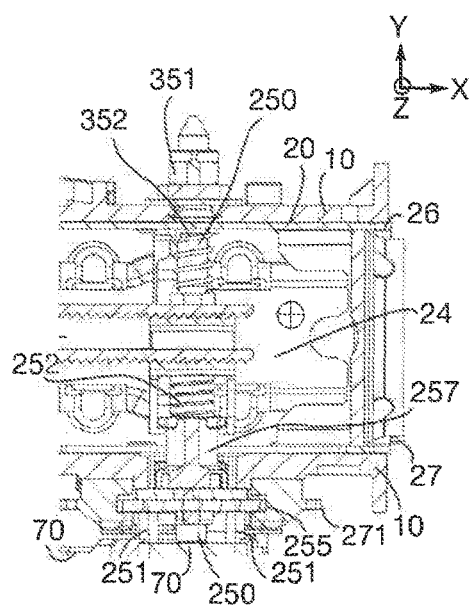
FIG. 16b represents a section of FIG. 16a as seen from above but with the support shown.
Figure 17A:
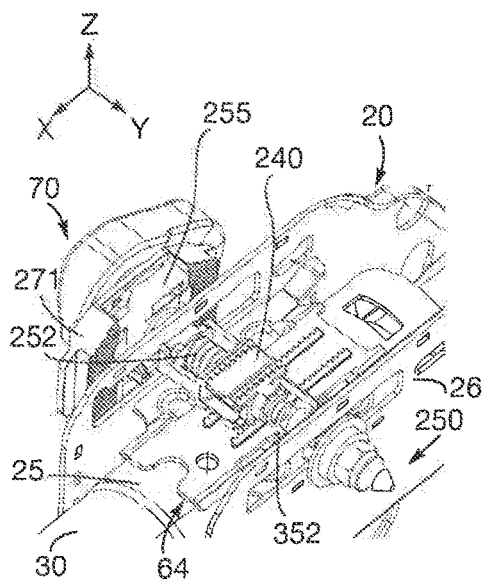
FIG. 17a corresponds to FIG. 16a but with the wedge in an unlocked position.
Figure 17B:
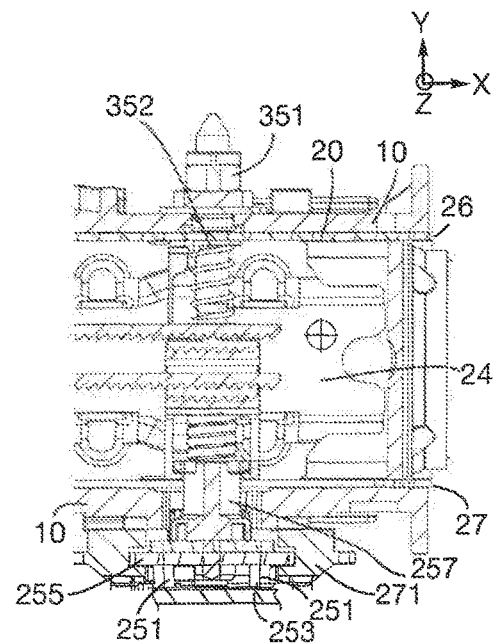
FIG. 17b represents a section of FIG. 17a as seen from above but with the support shown.

FIGS. 16b and 17b are sectional views as seen from above on a plane passing through and parallel to the rows of teeth of the upper face 23 of the spacer 63 of the adjustable body 20. The upper face 23 is therefore not shown in FIGS. 16b and 17b. Likewise, the upper spacer 63 is not shown in FIGS. 16a and 17a so that the wedge 240 and the shaft 250 can be seen.

As in the previous embodiments, the wedge 240 is mounted to be mobile on the shaft 250 and is able to move along the shaft.

Note that as shown in FIGS. 16a, 16b, 17a and 17b the teeth of the rows are oriented in the other direction compared to the embodiments from the previous figures. For example, the teeth of the wedge 240 point toward the second end of the shaft 250 and those of the adjustable body 20 toward the first end of the shaft 250, the first end being that facing toward the junction of the shaft with the control lever 70. A principal spring 252 is positioned on one side of the wedge 240, between the latter and the first end of the shaft.

In this embodiment, a secondary spring 352 is positioned between the wedge 240 and the second end of the shaft 250, its turns being wound around the shaft 250, like those of the principal spring 252.

The pin system comprises two receiving blocks 255 and 253 between which pins 251 are accommodated. A first receiving block 253 is fixed to the control lever 70. The pins 251 are fixed on one side of this first receiving block 253 so that they are free to rotate and on the other side so that they are free to rotate to one side of the second receiving block 255, with a given inclination that is not perpendicular to the blocks when the steering column is unlocked (FIGS. 17a and 17b). This fixing and inclination are such that when the control lever 70 is actuated the first receiving block 253 turns and changes the inclinations of the pins 251, which drives the two receiving blocks 253 and 255 apart. As can be seen, the receiving blocks 253 and 255 are farther apart in FIG. 16b than in 17b.

The first receiving block 253 is mounted so as to be fixed relative to the shaft 250, the first end of the latter being housed in the control lever 70.

In this example, the shaft 250 is fixed into the first receiving block 253 and passes through the second receiving block 255, a mobile abutment 257, the principal spring 252, the wedge 240 and the secondary spring 352. It also passes through the adjustable body 20 through its oblong holes 28 and 29.

The movement of the receiving blocks 253 and 255 away from each other pushes on the mobile abutment 257, which will then push on the principal spring 252, the stiffness of which is higher than that of the secondary spring 352. The principal spring 252 then pushes on the wedge 240 with the result that the teeth of the latter move toward those of the spacers 64 and 63.

The pin system, the mobile abutment 257, the principal spring 252 and the wedge 240 are arranged so that the teeth mesh and therefore so that the wedge comes to abut against the teeth of the adjustable body 20 before the mobile abutment 250 has stopped moving. The mobile abutment 257 will therefore continue to move, loading the principal spring 252. The resulting force is generated both in the locking position and in the tooth on tooth position. As described with reference to the previous embodiment, this force enables a firm tooth on tooth position with the ability to mesh from the position in the event of a front-end impact. The force generated by the spring in this position is higher than that of the secondary spring 352. The clamping effect maintains the mobile abutment 257 in position. In the locking position (FIGS. 16a and 16b), the principal spring 252 also enables firm retention of the meshing teeth.

The movement of the wedge 240 toward the locking position compresses the secondary spring 352.

In this example, as in the previous embodiment, the shaft 250 is a clamping screw screwed into a clamping system 351. A gripping part 271 is actuated by the control lever 70 so as also to clamp the walls of the support 10 against the walls 26 and 27 of the adjustable body 20.

When the steering column 1 is unlocked the spring 352 enables the wedge 240 to be driven in the other direction along the shaft 250 and therefore the teeth of the wedge 240 to move away from those of the spacers 63 and 64. The gripping part 271 and the clamping system 351 are also moved apart and so the support 10 no longer clamps the adjustable body 20. It will then be possible to adjust the steering column 1.

Although the coil springs represent a preferred embodiment of the invention, it would be possible to use leaf springs, for example by arranging them in the space between the guiding faces on either side of the driving shaft 50, 150, 250, bearing on one side on the wedge and on the other side on a point fixed relative to the shaft, such as an abutment fixed or mounted on top of the shaft or on top of the adjustable body.

Similarly the cam profiles can be variable. For example, the driving profile can be a local deformation on the shaft and have a polygonal or oblong profile, the corresponding profile of the wedge being linear. It can further be circular, the wedge then having a profile with a ramp, as described above for example.

Generally speaking, the invention enables the adjustable body 20 to be simply designed using pressed metal plates. The plates used may be steel plates or aluminium alloy plates. This facilitates the assembly of the adjustable body, especially as a plurality of parts are mounted inside the latter.

For example, it is possible to have four pressed metal plates each forming
- the interior envelope 25 defining the sliding chamber of the tube 30,
- the upper spacer 63,
- the lower spacer 64,
- a part with a "U" section, the two arms of the "U" forming the plane walls 26 and 27 with the oblong holes 28, 29.

These plates are welded together, for example.

Of course, the number of rows of teeth is not limiting on the invention. The results are better with two rows on one face of the wedge and two rows on the facing guiding face, and even better by further having at least one, preferably at least two rows on the other face of the wedge and the facing guiding face. There may for example be three rows of teeth on each of the guiding and guided faces.

The steering column according to embodiments of the invention therefore enables effective immobilization of the adjustable body within a reduced overall size. This is notably made possible by accommodating the wedge inside the adjustable body and its movement in translation. It remains effective even in the tooth on tooth position.

The manufacture of the adjustable body is also simplified.

The invention claimed is:

1. Steering column comprising:
    an adjustable body intended to be mounted so as to be free to slide on a support intended to be fixed at a single position to a vehicle chassis, the adjustable body comprising two walls,
    a tube fixed to the adjustable body, intended to be operably coupled to the steering wheel of the vehicle,
    a wedge housed inside the adjustable body and mobile between an unlocked position and a locking position inside the adjustable body between the walls and at a distance from these latter,
    means for driving and means for guiding the wedge, arranged with the wedge so as on the one hand to be able to drive the wedge in a simple translation movement from the unlocked position toward the locking position so that the wedge can come to bear against the adjustable body, the wedge then being in the locking position, and on the other hand to immobilize the wedge in the locking position in a fixed manner relative to some of the driving means that are adapted to be fixed relative to the chassis of the vehicle when the wedge is in the locking position,
    in which the adjustable body comprises at least one guiding face against which the wedge is able to slide in guiding contact when the wedge is driven in movement between said unlocked position and said locked position,
    in which the guiding face of the adjustable body includes a row of teeth, the wedge comprising a guided face including at least one row of teeth, oriented to face a corresponding row of teeth of the adjustable body guiding face and are able when the wedge is placed in the locking position to bear against the corresponding row of teeth of the guiding face,
    and in which the guided face and guiding face are oriented generally parallel to each other and the guiding face row of teeth and the guided face row of teeth are oriented so that each tooth points in a direction generally parallel to their corresponding guiding face and guided face.

2. Steering column according to claim 1, in which the translation movement is tangential to the adjustable body and/or transverse to the longitudinal axis of the adjustable body.

3. Steering column according to claim 1, in which the adjustable body comprises two parallel guiding faces, the wedge being accommodated between the two guiding faces.

4. Steering column according to claim 1, in which at least one row of teeth is formed by a rack.

5. Steering column according to claim 4, in which at least one rack is a part mounted on the wedge and/or on the corresponding guiding face the part being fixed, notably glued, welded or clipped, to the wedge and/or to the guiding face.

6. Steering column according to claim 4, in which at least one rack is formed in one piece with the wedge and/or the corresponding guiding face.

7. Steering column according to claim 1, in which the rows of teeth are aligned parallel to the longitudinal axis of the tube.

8. Steering column according to claim 1, in which the driving and guiding means comprise a shaft on which the wedge is mounted.

9. Steering column according to claim 8, in which the steering column comprises a principal elastic means inside the adjustable body bearing at one end on the wedge, the other end being mounted against an abutment adapted to be immobilized relative to the shaft, the abutment, the principal elastic means and the wedge being mounted and aligned on the shaft according to a mounting direction along the shaft extending from the abutment to the wedge, the mounting direction being the same as the direction of movement in translation of the wedge towards its locking position, the abutment, the principal elastic means and the wedge being arranged so that when the wedge is in the locking position the principal elastic means are loaded and therefore exert a force on the wedge so that the wedge bears on the adjustable body.

10. Steering column according to claim 9, in which the principal elastic means is a coil spring, the turns of the spring being wound around the shaft.

11. Steering column according to claim 8, in which the shaft and the wedge each comprise a profile, the profiles being in contact and arranged so that in a locking rotation direction of the shaft the profile of the shaft bears on that of the wedge and drives its movement along the shaft toward its locking position.

12. Steering column according to claim 8, the driving means comprise a mobile abutment and means for pushing the mobile abutment in translation along the shaft, the abutment being connected to the wedge so as to be able to push the latter when the mobile abutment is pushed by the pushing means in the direction of movement in translation of the wedge toward its locking position.

13. Steering column according to claim 8, in which the shaft passes through the wedge.

14. Steering column according to claim 8, the adjustable body including at least one guiding face against which the wedge is able to slide when the wedge is driven in movement, in which the two walls of the adjustable body each include an oblong opening the greatest length of which extends parallel to the axis of the tube, the shaft passing through the adjustable body through the openings, and in which the adjustable body comprises two spacers joining the two walls through which the shaft passes, the spacers having facing faces that form the guiding faces, the walls and the spacers defining a housing for the wedge.

15. Steering column according to claim 1, in which the guiding face and the guided face are generally planar.

16. Steering column comprising:
    an adjustable body intended to be mounted so as to be free to slide on a support intended to be fixed at a single position to a vehicle chassis, the adjustable body comprising two walls,
    a tube fixed to the adjustable body, intended to be connected to the steering wheel of the vehicle,
    a wedge housed inside the adjustable body and mobile between an unlocked position and a locking position inside the adjustable body between the walls and at a distance from these latter,
    means for driving and means for guiding the wedge, arranged with the wedge so as on the one hand to be able to drive the wedge in a simple translation movement from the unlocked position toward the locking position so that the wedge can come to bear against the adjustable body, the wedge then being in the locking position, and on the other hand to immobilize the wedge in the locking position in a fixed manner relative to some of the driving means that are adapted to be fixed relative to the chassis of the vehicle when the wedge is in the locking position, in which the adjustable body comprises two parallel guiding faces against which the wedge is able to slide when the wedge is driven in movement, the wedge being accommodated between the two guiding faces, these two guiding faces guiding the wedge from the unlocked position.

17. Steering column according to claim 16, in which each guiding face includes a row of teeth the wedge comprising at least one row of teeth, that face the corresponding row of teeth of the guiding face and are able when the wedge is placed in the locking position to bear against the corresponding row of teeth of the guiding face.

18. Steering column according to claim 17, in which the teeth are oriented so that each tooth points in a direction parallel to the corresponding guiding face.

19. Steering column comprising:
   an adjustable body intended to be mounted so as to be free to slide on a support intended to be fixed at a single position to a vehicle chassis, the adjustable body comprising two walls,
   a tube fixed to the adjustable body, intended to be connected to the steering wheel of the vehicle,
   a wedge housed inside the adjustable body and mobile between an unlocked position and a locking position inside the adjustable body between the walls and at a distance from these latter,
   means for driving and means for guiding the wedge, arranged with the wedge so as on the one hand to be able to drive the wedge in a simple translation movement from the unlocked position toward the locking position so that the wedge can come to bear against the adjustable body, the wedge then being in the locking position, and on the other hand to immobilize the wedge in the locking position in a fixed manner relative to some of the driving means that are adapted to be fixed relative to the chassis of the vehicle when the wedge is in the locking position,
   in which the driving and guiding means comprise a shaft on which the wedge is mounted, in which the adjustable body includes at least one guiding face against which the wedge is able to slide when the wedge is driven in movement, in which the two walls of the adjustable body each include an oblong opening the greatest length of which extends parallel to the axis of the tube, the shaft passing through the adjustable body through the openings, and in which the adjustable body comprises two spacers joining the two walls through which the shaft passes, the spacers having facing faces that form the guiding faces, the walls and the spacers defining a housing for the wedge.

* * * * *